United States Patent [19]

Harvey

[11] 4,349,850

[45] Sep. 14, 1982

[54] CASSETTE TAPE MONITOR

[76] Inventor: William Harvey, 1300 Daleside, Hinckley, Ohio 44233

[21] Appl. No.: 6,288

[22] Filed: Jan. 25, 1979

[51] Int. Cl.³ .................................................. G11B 15/48
[52] U.S. Cl. ................................. 360/74.2; 360/74.6; 360/137
[58] Field of Search .................... 360/74.2, 74.6, 74.7, 360/137

[56] References Cited

U.S. PATENT DOCUMENTS 3,694,585 9/1972 Goldner ............................. 360/74.7
3,883,893 5/1975 Ueki .................................. 360/74.2

FOREIGN PATENT DOCUMENTS 1200564 4/1964 Fed. Rep. of Germany ..... 360/74.2
2241572 8/1972 Fed. Rep. of Germany ..... 360/74.2
2744152 6/1978 Fed. Rep. of Germany ..... 360/74.2
52-4205 1/1977 Japan ................................. 360/74.2

Primary Examiner—Vincent P. Canney
Attorney, Agent, or Firm—Henn & Cain

[57] ABSTRACT

An improvement in tape recorders and players which comprises a means to detect whether the spindles or reels are rotating and an indication means which will signal to the operator when there is no rotation. An electric circuit can be used to transmit a signal from the means to detect to the indication means.

2 Claims, 9 Drawing Figures

CASSETTE TAPE MONITOR

BACKGROUND OF THE INVENTION

This invention is in the field of tape handling devices and information-storage and -retrieval devices; more particularly, the invention relates to devices for detecting and indicating the rotation of cassette tape reels.

Tape recorders and players are in common use. Such devices find uses in the computer, music, and television industries, the field of education and in many other areas. Two general types of taping systems are in common use. The first is the reel-to-reel type system which was the earlier system and which is still commonly used. The second is the use of cassettes.

The cassette system has become very popular. Basically, it is a specialized reel-to-reel system; that is, it is a self-contained unit which has two reels and a given length of tape. Various standard-size cassettes are now in use, and various players and recorders both of the audio and video type are available for corresponding size cassettes.

In the past, when the reel-to-reel type tape players and recorders were more popular, and with current reel-to-reel systems, the rotation of the reels is apparent from the mere location of the reels on the recorder or player. One can look at the reels to see if there is rotation.

When cassettes are used, it is generally difficult or impossible to see if the spindles or reels on which the tape is rolled are rotating during operation of a recorder or player. This is of particular concern when recording is taking place, for if the reels are not rotating, no record will be made. Should a malfunction cause the spindle or reel to stop rotating, it may easily go undetected, particularly if the reel is not in plain view. Generally, if the reels are not turning during the playing of a cassette, this will readily be apparent, for there will be not output. It would be convenient to have a means to indicate that the reels are not turning in both the playing and recording situations. Such a means is of particular importance while recording, for it may be the only way the operator will know that the reels are not turning. In a situation where a cassette is playing, a means to indicate that the reels are not turning is helpful to narrow down and thereby quicken the solution to the breakdown or malfunction.

SUMMARY OF THE INVENTION

The present invention is an improvement in tape recorders and players and particularly cassette tape recorders and players. It comprises a means to detect whether the spindles or reels are rotating. If no rotation is detected, an indication means will signal that fact to the operator or user. An electric circuit can be used to transmit a signal from the detection means to the indicator means.

Thus, it is the general object of the present invention to provide a device which will detect and indicate the rotation or lack thereof for reels and spindles of tape recorders and players. This invention can be used with reel-to-reel type tape recorders and players, but will be particularly useful in cassette-type tape recorders and players.

It is a further object of this invention to have embodiments suitable for the following uses: An embodiment which can be built into a tape recorder and player; an embodiment which can be added onto existing tape recorders and players; and an embodiment that can be built, in part, in the cassettes themselves.

DESCRIPTION OF THE PREFERRED EMBODIMENT

The present invention concerns the problem which tape player and recorder operators have in determining whether the spindles or reels are rotating. The preferred embodiment comprises an electric circuit to transmit an electric signal. The electric circuit further comprises a means to detect rotary motion and electrically signal such detection and an indicator means which indicates that the signal has been transmitted.

This invention is an improvement in tape recorders and players of the type having spindles to receive tape on reels. The most basic form of this invention will be understood by reference to FIG. 1, which shows a circuit to detect rotary motion and to electrically signal if there is or is not rotary motion and indicate to the operator by an indicator means that there is or is not motion.

The circuit shows rotary contact points 32 and 36. Although two are shown, only one is necessary to close a circuit and more than two can be used. The rotary contacts can rotate with the spindle or with the tape reel.

The circuit shows stationary contact points 31 and 33. Although two are shown, only one is necessary to close a circuit, and more than two can be used. The stationary contact points must be positioned to correspond to the rotary contact points so that the circuit will close and open during rotation.

An indicator means 34 is placed in circuit so that upon detecting a closed circuit or an open circuit during rotation of the rotary contacts, the indicator means will so indicate in a way which will be apparent to the operator. Such indicator means are known in the art and are commonly available, such as audio or visual indications. The indicator flashes during rotation and remains steadily on or off only when there is no rotation. Various indicator means can be used to give a myriad of indications that there is or is not rotation of the spindle or the reel.

Figure 1:
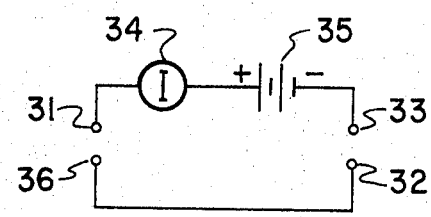
FIG. 1 is a schematic summary of the circuit used in the present invention.

The circuit of FIG. 1 also shows a power supply 35. This can be the same power supply that the tape recorder and tape player will use. If the improvement is desired to be an add-on unit, the power supply can be separate from that of the main tape recorder and tape player.

Figure 2:
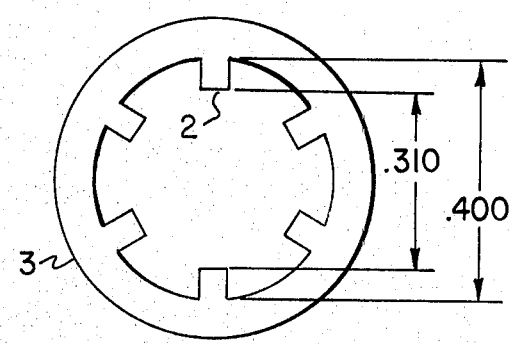
FIG. 2 is a view of the inside portion of a typical cassette reel.

In describing the more specific embodiments of the present invention, it will be helpful to refer to FIG. 2, which is the inside portion of a typical audio cassette reel 1. Two such reels can be seen by looking at the side of a cassette. The inside of the reel is circular with a diameter of approximately 0.400 inches. There are six teeth 2 spaced at equal distances apart disposed around the inside of the reel. These teeth are approximately 0.045 inches long.

Figure 3:
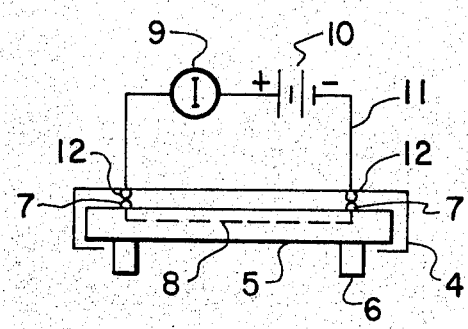
FIG. 3 is a side view of a rotating contact ring set into a stationary contact shell plus a circuit for indication of rotation.
Figure 5:
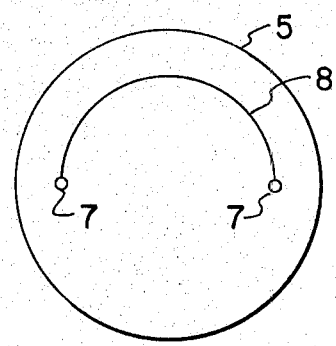
FIG. 5 is a top view of the rotating contact ring.
Figure 4:
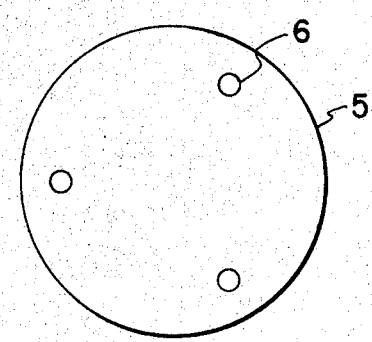
FIG. 4 is a bottom view of the rotating contact ring.

FIGS. 3, 4 and 5 illustrate one embodiment of the invention. A rotating contact ring 5 is set into a stationary contact shell 4. The rotating contact ring 5 has at least one and preferably three or more extensions 6 from the bottom. These extensions 6 are located so as to interact with the teeth 2 of the inside portion of the cassette reel. FIG. 3 shows three extensions 6 located between 0.155 and 0.20 inches from the center of the rotating contact ring 5 and at about 120° apart, thereby being compatible with the inside portion of the audio cassette reel shown in FIG. 2. As shown in FIG. 5, there are two contact points 7 located on the top of the rotating contact ring 5. These contact points 7 are connected by an insulated conducting means 8, such as a wire or a copper strip set into the rotating contact ring 5. Although the contact points 7 are shown on the top of the rotating contact ring 5, they can be at any convenient location on the rotating contact ring 5.

FIG. 3 shows the stationary contact shell 4. This shell can be used as needed, but is not necessary for the present invention. What is important is a means to support stationary contact points 12. These contact points can be contact points at corresponding locations to the contact points 7 on the rotating contact ring 5 as shown, or stationary contact arcs located to assume simultaneous contact with the two rotating contact points 7. The rotating contact points 7 can be contact arcs or strips as well. Thereby, when the rotating contact points 7 and stationary contact points 12 are in corresponding position and in contact, the circuit described below will be closed.

The circuit, as noted, is shown in FIGS. 3 and 5. On the top view of the rotating contact ring 5 there is a rotating conductor means 8 connected between the two contact points 7. FIG. 3 shows a stationary conductor means 11 connected between the two stationary contact points 12. Placed in this circuit is a power supply 10 and an indicator means 9.

The embodiment described immediately above and shown in FIGS. 3, 4 and 5 can be used as an add-on unit to existing tape recorders or players, or as a unit built into a tape player and recorder as an integral part during manufacture.

Figure 6:
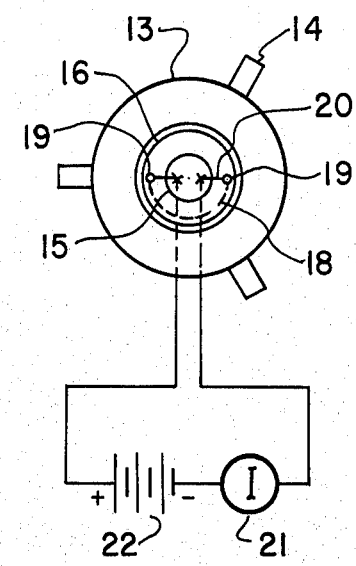
FIG. 6 is a top view of an embodiment of the invention in a spindle.
Figure 7:
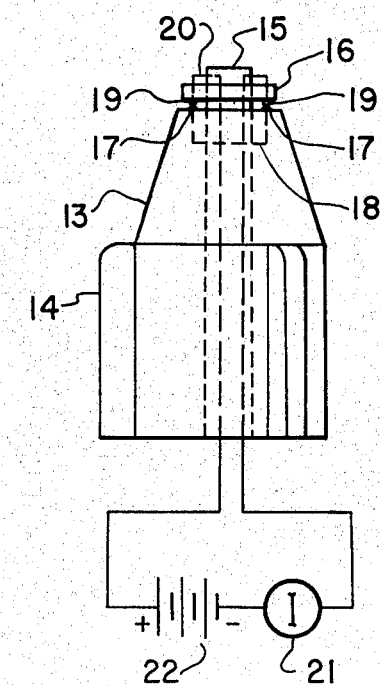
FIG. 7 is a side view of FIG. 6.

Another embodiment of the present invention is shown in FIGS. 6 and 7. FIG. 6 is the top view and FIG. 7 is the side view of the present invention installed in a cassette spindle 13. The invention can be incorporated into one or both of the two spindles in a reel-to-reel or cassette-type tape player or recorder.

The cassette spindle 13 has an outer diameter slightly less than twice the inner diameter of the reel 1, less twice the length of one of the teeth 2. A typical audio spindle 13 as shown in FIGS. 5 and 6 has three ribs 14 at about 120° of arc apart along the outside length. These ribs interact with the reel teeth so that the reel and spindle 13 rotate together during proper operation of the tape player or recorder. The spindle 13 rotates about a stationary inner post 15. Above the spindle and mounted on the stationary inner post 15 is a stationary member, such as a disc 16. The present invention is easily compatible with this type of spindle.

Two contact points 17 are located on the rotatable spindle 13 and are connected by an conducting means 18 such as an insulated copper wire or a copper strip inset into the spindle 13. More than two contact points can be used and only one is necessary. The stationary disc 16 has stationary contact points 19 mounted thereon. The stationary contact points 19 are at corresponding location to the contact points 17 on the rotating spindle 13 as shown or stationary contact arcs located to assume simultaneous contact with the two rotation contact points 17. Although two stationary contact points are shown, more than two can be used and only one is necessary. Of course, the rotating contact points 17 can be contact arcs or strips as well. Thereby, when the stationary contact points 19 and the rotating contact points 17 are in corresponding position and in contact the circuit described below will be closed.

In summary, the circuit is shown in FIGS. 6 and 7. A rotating conductor means 18 is connected between two rotating contact points 17. A stationary conductor means 20 is connected between the two stationary contact points 19. Placed in this circuit is a power supply 22 and an indicator means 21.

The embodiment as described immediately above and shown in FIGS. 6 and 7 is designed to be built into a cassette type tape player or recorder and can easily be adapted to a reel-to-reel type player or recorder.

Figure 8:
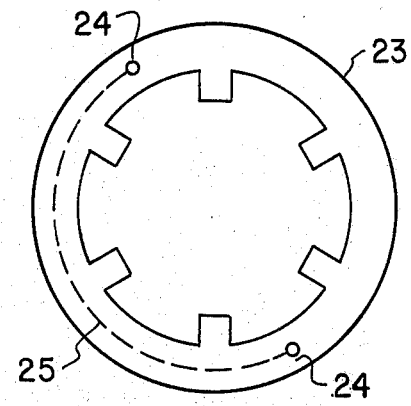
FIG. 8 is top view of an embodiment of the rotating contacts in the cassette reel.
Figure 9:
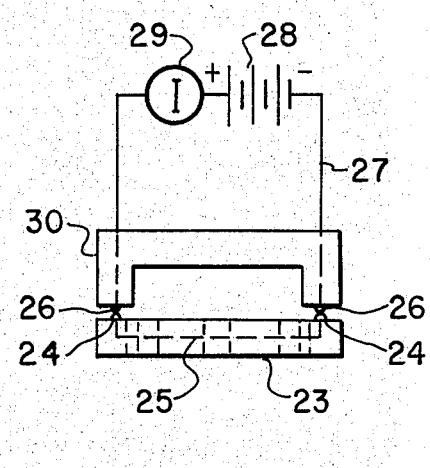
FIG. 9 is a side view of an embodiment of the rotating contacts in the cassette reel with the stationary portion of the circuit.

Another embodiment of the present invention is shown in FIGS. 8 and 9 wherein the reel 23 contains two contact points 24 and the conducting means 25. The contact points 24 will rotate with the reel 23. More than two contact points 24 can be used and only one is necessary. Two corresponding stationary contact points 26 and a conducting means 27 between them, with an indicator means 29 and a power supply 28 connected to the conductor means 27 are also shown. More than two stationary contact points 26 can be used and only one is necessary. This stationary portion of the circuit has a housing 30 to assure that the stationary contacts 26 remain in corresponding locations with regard to the contact points 24 on the reel 23. Thereby, contact points 24 on the reel and stationary contact points 26 are in corresponding position and in contact, the circuit will be closed. The stationary portion of the circuit can be installed in three embodiments as follows: it can be made part of the cassette; or it can be put in an add-on unit; or it can be made as part of the tape player or recorder.

All of the above embodiments include a power supply and an indicator means. The power supply can be a separate source such as a battery or the same source of power which the tape recorder or player is using. The indicator means, as noted, can be visual such as a light that turns on and off during proper operation and which remains steadily on or off during defective performance, when the reel and thereby the rotating contacts are not rotating but should be. Further, a light can blink when the player or recorder is operating properly and which would be on or off when the reel is not rotating but should be. Other indicating means such as audio device as bells or buzzers can also be used to indicate improper operation.

Contact points used in the present invention can be any of the many types known in the art which are suitable for the intermittent contact necessary for this invention.

Modifications, changes and improvements to the preferred forms of the invention herein disclosed, described and illustrated may occur to those skilled in the art who come to understand the principles and precepts thereof. Accordingly the scope of the patent to be issued herein should not be limited to the particular embodiments of the invention set forth herein, but rather should be limited by the advance of which the invention has promoted the art.

What is claimed is:

1. An improved tape player and recorder of the type having spindles adapted to receive tape on reels or cassettes, wherein said improvement consists of a power supply, at least one contact rotating on a said spindle and at least one stationary contact carried on said player and recorder, a light and an electrical circuit comprising said contacts, said light and said power supply, said circuit, causing said light to turn on when said contacts close said circuit and to turn off when said contacts open said circuit, responsive to motion of said spindles.

2. In a tape player and recorder of the type having spindles adapted to receive tape on reels or cassettes, the method of visually determining movement of a tape during recording which comprises an intermittently illuminated light, said light being illuminated in response to rotary movement of at least one spindle, said spindle having at least one contact rotating thereon, and electrical circuit means including said rotating contact, at least one stationary contact, power supply means, and said light, wherein said rotary motion of said spindle causes said light to be illuminated intermittently.

* * * * *